Figure 1:
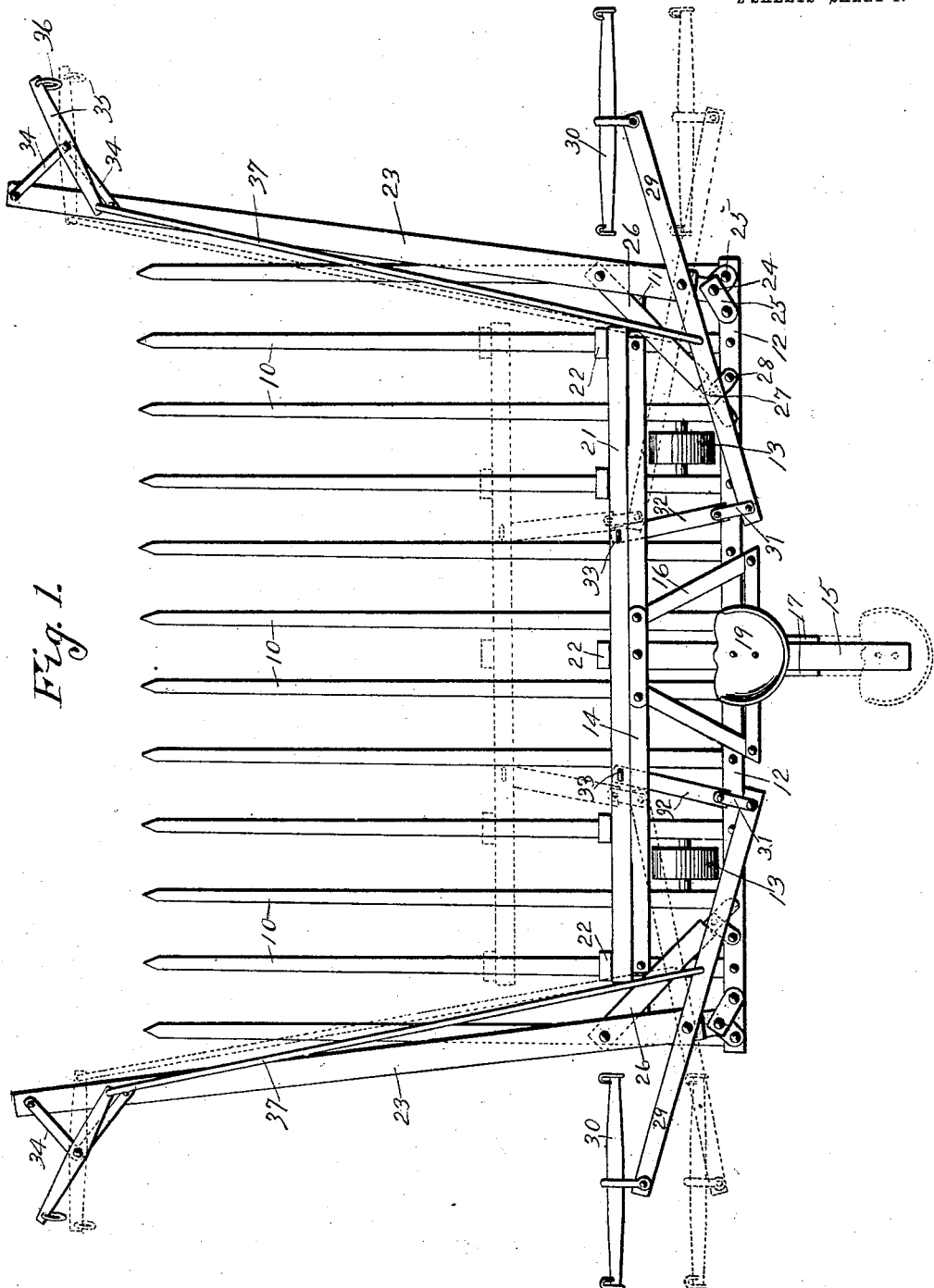

No. 863,192. PATENTED AUG. 13, 1907.
L. J. LINDSAY.
HAY RAKE.
APPLICATION FILED MAY 14, 1906.

2 SHEETS—SHEET 1.

Witnesses
K. K. Keffer.
J. B. Smutney.

Inventor:
Leroy J. Lindsay,
by Orwig & Lane Attys.

No. 863,192. PATENTED AUG. 13, 1907.
L. J. LINDSAY.
HAY RAKE.
APPLICATION FILED MAY 14, 1906.
2 SHEETS—SHEET 2.
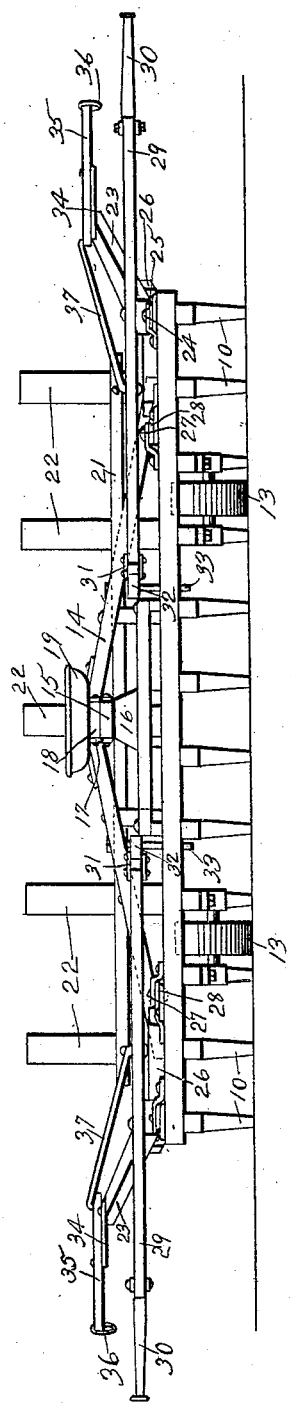
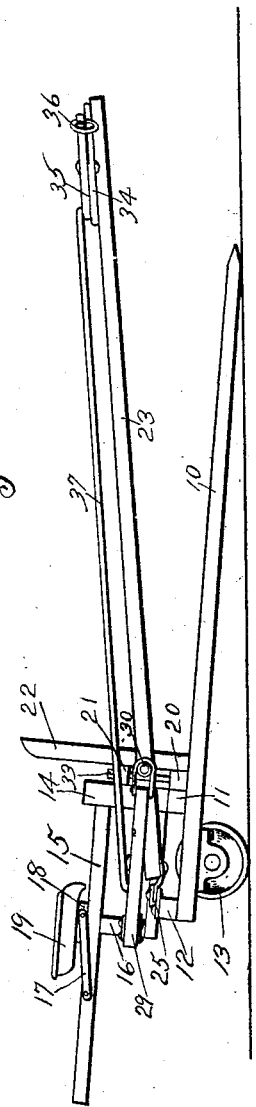
Witnesses.
K. K. Keffer.
J. B. Smutney.
Inventor.
Leroy J. Lindsay.
by Orwig & Lane Attys

UNITED STATES PATENT OFFICE.

LEROY J. LINDSAY, OF SEYMOUR, IOWA.

HAY-RAKE.

No. 863,192.

Specification of Letters Patent.

Patented Aug. 13, 1907.

Application filed May 14, 1906. Serial No. 316,888.

*To all whom it may concern:*

Be it known that I, LEROY J. LINDSAY, a citizen of the United States, residing at Seymour, in the county of Wayne and State of Iowa, have invented a certain new and useful Hay-Rake, of which the following is a specification.

The object of my invention is to provide a hay rake of simple, durable and inexpensive construction of the class designed to be advanced over a field by draft animals and to gather hay in large quantities and deposit it adjacent to a hay stack.

A further object is to provide a hay rake of this class with two tongues to project forwardly and outwardly from the hay rake so that the draft animals may advance on opposite sides of the machine and to provide means whereby said tongues may be quickly and easily detached so the hay rake may easily be carried through a narrow gate-way.

A further object is to provide means whereby hay gathered upon the rake will be automatically forced toward the forward ends of the rake tines when the rake is backed by the draft animals so that the tines may be withdrawn from the hay rake and the hay deposited on the ground.

A further object is to provide a seat for a rake of this class that may readily, easily and quickly be shifted so that the operator may apply his weight to the machine in order to bear the tines more or less firmly toward the ground.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a plan view of a complete hay rake embodying my invention, the dotted lines show the hay pushing frame and connected parts with the said frame at its forward limit. Fig. 2 shows a rear elevation of same, and Fig. 3 shows a side elevation of same.

Referring to the accompanying drawings, the hay rake proper is composed of a number of longitudinal tines 10 spaced apart and rigidly connected at their rear ends by two transverse beams 11 and 12. The rear end portion of the rake is supported upon two small wheels 13 and the forward ends are designed to rest upon the ground surface. Erected upon the forward cross piece 11 is an arch 14 and a seat brace bar 15 is secured to the central portion of said arch and the said beam rests upon a frame 16 and projects rearwardly from the rake frame. In this way the said seat bar 15 is firmly supported. Pivoted to the sides of the bar are two links 17 which are also pivoted to a block 18 to which the seat 19 is fixed. By this arrangement the seat and its supporting block 18 may be made to rest upon the forward portion of the bar 15 as shown in Figs. 1 and 3 or the seat may be grasped by the operator's hand, moved upwardly and rearwardly to the position shown by dotted lines in Fig. 1 and this may be done without adjusting any screws or bolts or other devices.

Slidingly mounted upon the tops of the rake tines and in front of the arch 14 is a hay pushing frame composed of two transverse bars 20 and 21 and a number of uprights 22 fixed thereto, said hay pushing frame is capable of movement on top of the tines forwardly from the arch 14.

The rake is designed to be advanced by draft animals and I have provided two independent tongues of similar construction, one for each side of the machine. The tongue proper is indicated by the numeral 23 and is detachably connected at its rear end with the cross bar 12 by means of the pin 24 passed through the rear of the tongue and through the brackets 25 on the cross bar 12. A brace 26 is pivoted near the rear end of the tongue and extends rearwardly and inwardly and is detachably connected by the pin 27 with the brackets 28 on the cross bar 12. A lever 29 is fulcrumed near the rear end of the tongue and is provided at its outer end with a swingle-tree 30. Pivoted to its inner end are the links 31, pivoted to a bar 32, which latter is connected with the hay pushing frame, by means of a pin 33 detachably connected with the cross bars 20 and 21 of the hay pushing frame. Fixed to the forward end of the tongue 23 is an outwardly extending bracket 34 to which a lever 35 is pivoted. The outer end of the lever is provided with a link 36 to be attached to the harness of a draft animal and at the inner end of the machine 35 is a rigid rod 37 having its rear end pivoted to the lever 29 inside of its fulcrum point.

In practical use and assuming that draft animals are attached to the swingle-trees 30 and the levers 35. Then they may be easily driven by the operator on the seat 19. When the draft animals are moving forwardly, the levers 29 will have their inner ends at their rearward limit and the hay pushing frame will be held against the cross bar 11 and arch 14. This will hold the levers 35 with their outer ends at their forward limit. Then assuming that it is desired to discharge the load, the draft animals are first backed, with the result that the outer ends of the levers 35 are swung rearwardly and the inner ends of the levers 29 are forced forwardly relative to the rake tines and hence the hay pushing frame will slide across the tops of the tines toward their forward ends and push the hay from the rear of the rake toward the forward end thereof. It has been found that it is only necessary to start this movement of the hay, because as the rake is backed still further, the hay will project between the tines and rest upon the ground enough so that the tines may be withdrawn from beneath and the load deposited on the ground. As soon as the draft animals are again advanced, the lever 29 will force the hay pushing frame to its rearward limit of movement. Furthermore the operator may easily and quickly shift the position of the seat relative to the said bar 15 and by removing the pins 24 and 27 and 33, the tongues and their connected parts may be quickly and easily detached.

Having thus described my invention, what I claim and desire to secure by Letters Patent of the United States, therefor is—

1. The combination with a hay rake, of a tongue attached to the hay rake, a hay pushing frame slidingly mounted upon the top of the hay rake, a lever having one end connected with the hay pushing frame, a swingle-tree attached to the other end of said lever, a second lever in advance of the first and a rod connecting said levers.

2. The combination with a hay rake, of a tongue connected thereto, and extended forwardly and outwardly, a lever fulcrumed to the rear end of the tongue, a swingle tree connected with the outer end of said lever, a lever fulcrumed near the front of the tongue, means for connecting the outer end of the latter lever to the same draft animal that is attached to the swingle-tree, a rod pivoted to the inner end of the forward lever and also to the inner end portion of the rear lever, a hay pushing frame slidingly mounted upon the rake and means for connecting the frame with the inner end of the rear lever.

3. An improved hay rake, comprising a number of longitudinal tines, cross bars connecting them at their rear ends, supporting wheels for the rear end of the rake, a hay pushing frame slidingly mounted upon the tops of the tines, two tongues fixed to the rear of the rake and extended forwardly and outwardly, a lever fulcrumed to the rear end of each tongue, a bar pivoted to the inner end of each lever and connected to the adjacent end portion of the hay pushing frame, a swingle-tree on the other end of each lever, a lever fulcrumed to the forward end of each tongue and a rod connected to the inner end of each of said forward levers and also to the inner end portion of each of the rear levers.

4. An improved hay rake, comprising a number of longitudinal tines, cross bars connecting them at their inner ends, supporting wheels for the rear end of the rake, a hay pushing frame slidingly mounted upon the tops of the tines, two tongues detachably fixed to the rear of the rake and extended forwardly and outwardly, a lever fulcrumed to the rear end of each tongue, a bar pivoted to the inner end of each lever and detachably connected to the adjacent end portion of the hay pushing frame, a swingle-tree on the outer end of each lever, a lever fulcrumed to the forward end of each tongue and a rod connected to the inner end of each of said forward levers and also to the inner end portion of each of the rear levers.

5. The combination of a rake, a sweep board and means for moving said sweep board in direction of the ends of the rake teeth when the team is backed and for moving the sweep board back to its normal position when the team is pulling, the said means comprising pivoted devices arranged to be moved by the draft animals, and link connections between the said devices and the sweep board.

Des Moines, Iowa. April 26, 1906.

LEROY J. LINDSAY.

Witnesses:
W. O. SMITH,
T. P. RALPH.